April 18, 1950
K. J. KNUDSEN
2,504,931
MULTIPLE TEMPERATURE INDICATOR
AND OVERTEMPERATURE ALARM
Filed July 21, 1948
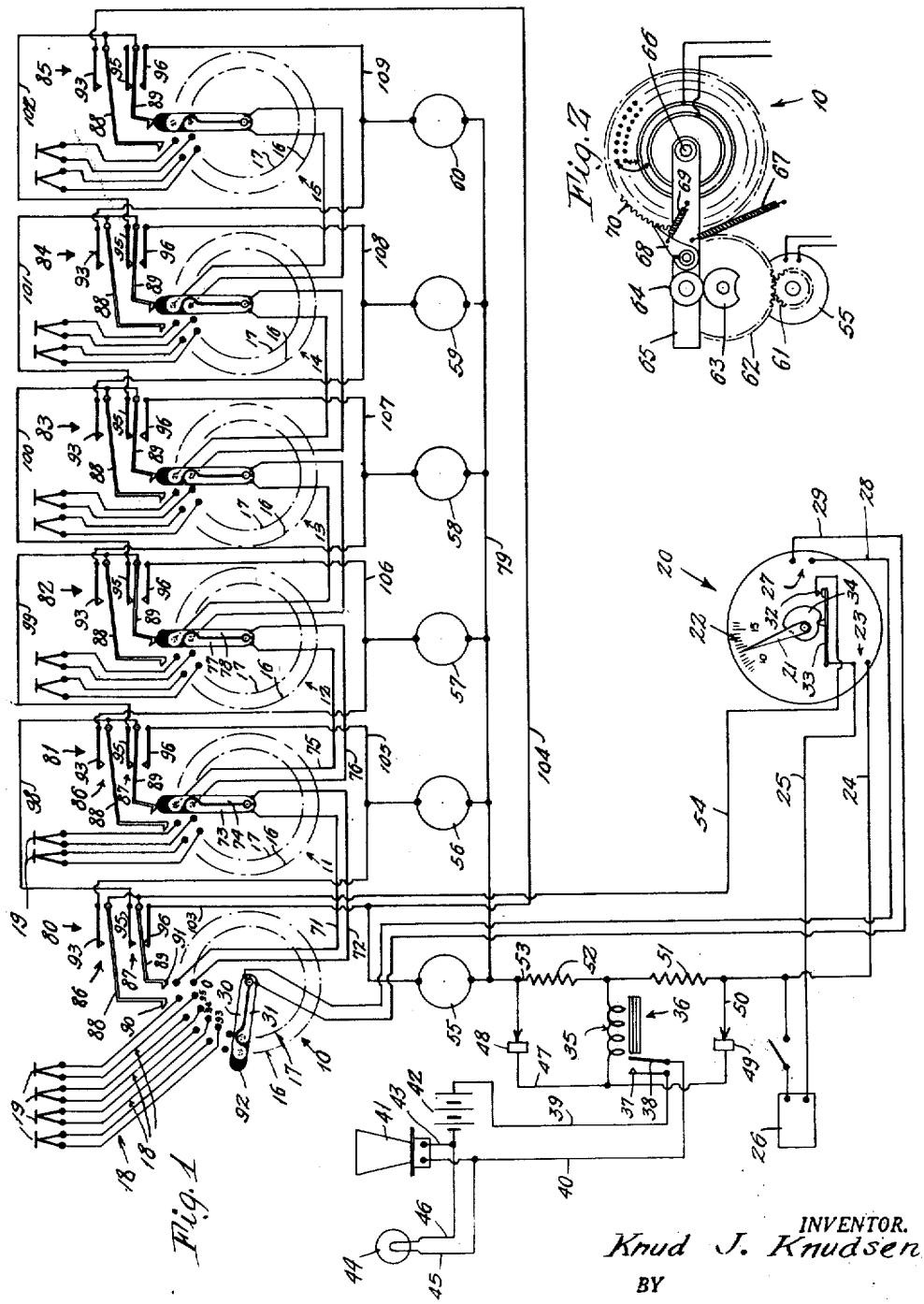
INVENTOR.
Knud J. Knudsen
BY
Johnson and Kline
ATTORNEYS

UNITED STATES PATENT OFFICE 2,504,931

MULTIPLE TEMPERATURE INDICATOR AND OVERTEMPERATURE ALARM

Knud J. Knudsen, Naugatuck, Conn., assignor to The Lewis Engineering Company, Naugatuck, Conn., a corporation of Connecticut Application July 21, 1948, Serial No. 39,893

7 Claims. (Cl. 171—97)

This invention relates to means and methods for automatically sequentially connecting a plurality of electric circuits to an electric instrumentality as for the purpose of obtaining a plurality of tests, or measurements, or other data or results.

The invention as illustrated herein is applied to the measuring and recording of temperatures of a very large number of parts of machinery or equipment, and to the giving of a signal when any temperature goes beyond a predetermined value. A method and apparatus for sequentially measuring and recording temperatures of a plurality of machine parts, and for giving a signal when any temperature exceeds a predetermined normal safe value, is described and claimed in my copending application Serial No. 22,328 filed April 21, 1948 and entitled "Multiple temperature indicator and overtemperature alarm." The device and method of this copending application involves periodic checking of ninety-six different temperatures; according to the present invention, by the provision of novel staged circuit control means, temperatures numbering greatly in excess of ninety-six may be periodically checked and indicated or recorded. As disclosed herein, the number of temperatures which may be repeatedly reliably measured and recorded, may be as great as five hundred and seventy; or more.

Methods and apparatus for accomplishing such a result have utility, for example, in connection with the operation of a mercury vapor boiler installation having a very large total number of boiler tubes, substantially in excess of several hundred, which are subject to overheating. The temperatures of these boiler tubes must be kept below certain values if failure of the boiler is to be avoided; such failure of course could have very undesirable consequences since it might involve shutting down the boiler for several days, and the accompanying equipment associated with the boiler. Therefore the providing of a reliable, periodic check on boiler tube temperatures is seen to be extremely important.

In the device of my copending application identified above a single large motor-driven rotary selector switch is provided, having ninety-six pairs of stationary contacts connected with a like number of thermoelements and periodically traversed by a pair of rotating blades so as to automatically and sequentially connect the thermoelements to a pyrometer device or meter which thereby may indicate and record the temperatures of machine parts with which the thermoelements are associated. If any one temperature being measured and recorded is found to exceed a predetermined value the pyrometer will automatically operate to cause a signal to be given and the selector switch will automatically halt, thereby to apprise an operator of the abnormal condition and also of the location of the same by the position of the selector switch.

According to the present invention a plurality of staged motor-driven selector switches is provided and made operable sequentially, the switches being so connected that the number of positions or settings of one selector switch is in effect multiplied by the number of stages, thereby to greatly extend the number of temperatures which may be indicated and recorded by the pyrometer. A novel control means provides for reliable sequencing and driving of the switches in predetermined order, the overall cycle constituted by the sequential switch operation being continually periodically repeated. I have found that, in conjunction with the present improved staged selector switch organization, the temperature indicating and recording means and switch driving or operating means of my copending application referred to, produce a desirable checking cycle having a relatively short period, whereby the boiler tubes may be continually rechecked before a dangerous condition develops which could ultimately result in the failure of the boiler.

Other features and advantages will hereinafter appear.

In the accompanying drawings:

Figure 1 is a diagrammatic view of the indicating, recording, and alarm device of the present invention, and Fig. 2 is a detail of the driving mechanism between one selector switch and its driving motor.

Referring to Fig. 1, the apparatus of the present invention comprises a plurality of two-pole rotary selector switches 10, 11, 12, 13, 14 and 15 having circular, concentric sets of stationary contacts 16 and 17 grouped in pairs, all but one of which are respectively connected by two-wire cables 18 with resistance thermometer bulbs or thermoelements 19.

Each of the selector switches 10 through 15 has a total of ninety-six pairs of stationary contacts, one pair being marked zero and the remaining pairs being consecutively numbered from one through ninety-five. As shown, the pair of stationary contacts marked zero of each switch is not connected to a thermoelement 19 but all of the remaining ninety-five pairs are. A total of six rotary selector switches are shown in the diagram, and since each switch has ninety-five pairs of contacts connected with ninety-five thermoelements, a total of six times ninety-five or five hundred seventy thermoelements 19 may be connected to the six rotary selector switches 10 through 15. Each thermoelement 19 may be associated with a different boiler tube of a mercury vapor boiler, for example, thereby enabling the temperature of five hundred seventy boiler tubes to be checked.

To accomplish such checking or measuring of the temperatures of the boiler tubes, and to indicate the temperatures which have been checked, a pyrometer device or meter 20 is provided, which may be a combined indicating and recording instrument having a pointer 21 and scale 22. The meter 20 may also have the usual type of circular chart and stylus (not shown) and may be of any suitable type, including a bridge circuit for connection with a thermoelement. Such meters are well-known and conventional, and therefore further details will not be described herein since these details per se form no part of the present invention. The meter 20 has terminals 23 connected by wires 24 and 25 with a power supply 26 which may furnish the usual one-hundred ten volt sixty-cycle current. The meter 20 also has terminals 27 for connection to a thermoelement, and such terminals are connected by wires 28 and 29 to rotary blades 30 and 31 respectively of the selector switch 10, the blades being adapted to traverse respectively the circular sets of stationary contacts 16 and 17 and to simultaneously engage the paired contacts of the sets. As shown, the blades 30 and 31 are electrically insulated from each other, and by this organization the meter 20 may be connected through the switch 10 sequentially to any one of ninety-five thermoelements 19, in response to rotation of the switch blades 30 and 31.

An alarm system is provided whereby a response of the meter 20 to an abnormally high temperature will cause a signal to be given. This system comprises a stationary contact 32 and a cooperable movable contact 33 in the meter 20, the contacts being actuable by a cam 34 movable with the meter pointer 29. Normally the contacts 32 and 33 are engaging each other; however, when an abnormal temperature is registered by the meter the cam 34 will separate the contact 33 from the contact 32. The contacts 32 and 33 are connected, by means to be described later, to control the energization of the coil 35 of a relay 36 having a pair of normally-closed contacts 37 and 38. The relay contacts 37 and 38 are connected by wires 39 and 40 respectively with an alarm siren 41 and a battery 42, the latter being connected by a wire 43 with the siren 41. Also, a signal bulb 44 is connected by wires 45 and 46 respectively with the wires 40 and 43. When the relay contacts 37 and 38 are engaging each other in response to deenergization of the relay 36, the bulb 44 will be lighted and the siren 41 will be sounded; when the relay contacts 37 and 38 are separated due to the relay 36 being energized, the bulb 44 will be extinguished and the siren 41 deenergized.

One end of the relay coil 35 is connected to a wire 47 which connects with rectifiers 48 and 49, the latter rectifier being connected by a wire 50 to the supply wire 24. A resistor 51 is connected to the wire 50 and to the other end of the relay coil 35, and said end of the coil is also connected to a resistor 52 in turn connected by a wire 53 to the remaining terminal of the rectifier 48. As will be later brought out, a current-conducting connection is established and continually maintained between the wire 53 and a wire 54 connected to the stationary contact 32 of the meter 20 whereby, whenever the meter contacts 32 and 33 are in engagement, corresponding to normal temperature conditions of the thermoelements 19, the relay coil 35 will be energized by direct current (by virtue of the rectifiers 48 and 49 in the relay coil circuit), thereby maintaining the relay contacts 37 and 38 separated and maintaining inoperative the alarm siren 41 and bulb 44. If at any time, however, the meter contacts 32 and 33 are separated, the energization of the alarm relay 36 will be discontinued, causing the siren 41 and bulb 44 to be energized to give a signal which is indicative of an abnormal temperature in one of the thermoelements 19.

The selector switches 10 through 15 are mechanically connected to be individually intermittently driven or advanced by electric motors 55, 56, 57, 58, 59 and 60 respectively. One mechanism (that associated with the rotary switch 10) by which the driving of the switches may be accomplished from the motors is shown in Fig. 2, being the same as that illustrated and described in detail in my copending application above referred to. This mechanism comprises a pinion 61 on the motor 55, engaging a gear 62 which drives a cam 63 engaged by a cam follower 64 carried on a bar 65 pivoted at 66. A helical extension spring 67 connected with the bar 65 maintains the follower 64 in engagement with the cam 63. The bar 65 has a pawl 68 biased by an extension spring 69 and adapted to engage a ratchet wheel 70 which is mechanically connected to drive the rotary contact blades 30 and 31 of the selector switch 10.

The operation of the actuating mechanism for the rotary switches, as shown in Fig. 2, is such that each set of rotary switch blades is advanced during a short interval of time and thereafter allowed to remain in its advanced position for another interval of time, and then advanced again, and so on, by the action of the cam 63. Preferably, the periods of rest of the switch blades are on the order of one and two-thirds seconds, and the periods of movement of the blades on the order of one-fifth of a second. These intervals may be varied, however, by proper motor gearing to suit the response of the particular pyrometer used.

In accordance with the present invention a novel and improved organization is provided whereby the selector switches 10 through 15 are automatically sequentially operated to effect sequential connection of all the thermoelements 19 to the meter 20, and to continually repeat this cycle of operations. In accomplishing this, the pair of contacts marked zero of the selector switch 10 is connected by wires 71 and 72 with rotary blades 73 and 74 respectively of the selector switch 11. The pair of contacts marked zero of the switch 11 is connected by wires 75 and 76 with blades 77 and 78 respectively of the selector switch 12. In like manner, the pairs of contacts marked zero of each of the switches 12, 13 and 14 are respectively connected to the pairs of blades of the next or succeeding switches, and the pair of contacts marked zero of the switch 15 is left unconnected. The motors 55 through 60 all have one terminal connected to a common supply wire 79 which is connected to the wire 53 of the alarm system described above.

Associated with the switches 10 through 16 respectively are banks of single pole switches 80, 81, 82, 83, 84 and 85, each bank comprising a pair of single pole switches 86 and 87. Each switch 86 has a movable contact 88 adapted to be raised by movement of the rotary switch blades of the associated selector switch from the 94th to 95th pair of stationary contacts of the selector switch, and to remain raised only until the selector switch blades move from the 95th pair to the pair of contacts marked zero. Each switch 87 has a movable contact 89 adapted to be raised in response to movement of the rotary switch blades of the associated selector switch from the 95th to the next pair of contacts (marked zero) and to be lowered when the switch blades leave the zero-marked pair of contacts and advance to the next pair of contacts marked one. The movable contacts 88 and 89 normally remain in their lowered positions as shown in the switch bank 80, except when raised by actuation of the rotary blades of the selector switch associated with them. Any suitable means for actuating the switches 86 and 87 from the rotary blades of the selector switch may be provided. As shown herein, camming portions 90 and 91 may be provided on the movable contacts, for engagement with an insulating portion 92 associated with the rotary blades of the selector switch. Each switch 86 has a stationary contact 93, and each switch 87 has a pair of stationary contacts 95 and 96, the stationary contacts being respectively cooperable with the movable contacts as clearly indicated in the diagram.

The movable contacts 88 and 89 of the switch bank 80 are connected together and with the wire 54 leading to the meter contact 32. The movable contacts of the banks of switches 81 through 85 are respectively connected together as shown and connected by wires 98, 99, 100, 101 and 102 with the stationary contacts 95 of the preceding banks of switches. The stationary contact 96 of the switch bank 80 is connected by a wire 103 with the remaining terminal of the motor 55, and the wire 103 is connected to a wire 104 connecting with the stationary contact 93 of the switch bank 85. The stationary contacts 95 of the switch banks 81 through 85 are respectively connected by wires 105, 106, 107, 108 and 109 with the stationary contacts 93 of the preceding switches, and also respectively connected with the remaining terminals of the motors associated with the selector switches of said banks. That is, the wires 105 through 109 are respectively connected with the remaining terminals of the motors 56 through 60.

The operation of the apparatus shown in Fig. 1 is as follows: Assuming all of the blades of the rotary selector switches 10 through 15 to be in the positions shown, and assuming that the particular thermoelement 19 connected through the switch 10 to the meter 20 has a normal temperature, contacts 32 and 33 in the meter will be engaging each other and current from the supply 26 will flow through said contacts and through the wire 54 to the movable contact 89 of the switch bank 80. Since this contact is engaging the stationary contact 96 of the switch bank 80, current will flow through same and the wire 103 and motor 55, and through the resistors 52 and 51 to the return of the supply 26. The motor 55 will be energized and will periodically advance the rotary blades 30 and 31 of the selector switch 10 to the succeeding pair of contacts of the sets 16 and 17. Also, the alarm relay 36 will be energized, maintaining the relay contacts 37 and 38 separated and rendering the alarm siren 41 and bulb 44 inoperative. As the selector switch 10 continues its advance it will sequentially connect the thermoelements 19 to the meter 20, and the temperatures of the elements will be indicated and/or recorded by the meter. If any temperature should be excessive and exceed a predetermined normal value, the meter cam will separate the meter contacts 32 and 33 and halt the motor 55 and also deenergize the alarm relay 36. This will cause the alarm to be given, and also will halt the rotary blades 30 and 31 of the selector switch, in the position where they connect with the thermoelement having the excessive temperature. Thus an operator will be apprised of the excessive temperature, and also apprised as to which thermoelement is too hot. In addition, the temperature will be measured and/or indicated at the meter 20. Upon such an occurrence, the operator may manually shift the rotary blades 30 and 31 of the switch 10 to the next pair of contacts, whereupon the instrument 20 will again register normal temperatures providing the thermoelement of the next set of contacts is at a normal temperature, resulting in the meter contacts 32 and 33 again engaging and energizing the motor 55 and deenergizing the alarm mechanism. The apparatus will again resume its operation, and the operator may take the necessary steps to remedy the over-temperature. When the rotary blades 30 and 31 reach the 95th pair of contacts of the selector switch 10, the movable contact 88 of the switch bank 80 will be raised and will be caused to engage the stationary contact 93 of the bank. This will cause current to flow through the wires 54 and 105 to the motor 56, energizing the said motor. Starting of the motor 56 will not immediately shift the rotary blades 73 and 74 of the selector switch 11 however, since there will be a period of dwell, preferably of approximately one and two-thirds seconds, until the cam of the switch-actuating mechanism is positioned to cause shifting of the rotary blades. During this interval the motor 55 will continue to operate, and just prior to its shifting the rotary blades 30 and 31 to the pair of contacts of the selector switch 10 marked zero, the rotary blades 73 and 74 of the selector switch 11 will be shifted to the number one pair of contacts by the motor 56. Shifting of the blades 30 and 31 to the zero pair of contacts in the switch 10 will cause lowering of the movable contact 88 and raising of the movable contact 89 of the switch bank 80. This will automatically disconnect the motor 55 by virtue of separation of the switch contacts 89 and 86; however, energization of the motor 56 will be maintained due to engagement of the movable switch contact 89 with the stationary contact 95 in the switch bank 80, since current will now flow through the wires 54 and 98 and through the switch contacts 89 and 96 of the switch bank 81 to the motor 56 (contacts 89 and 96 having become engaged in response to shifting of the switch blades 73 and 74 of switch 11 to the number one pair of contacts of said switch). Thereafter, energization of the motor 56 will be maintained, and the rotary selector switch 11 will be operated to sequentially connect all of the ninety-five thermoelements 19 of the switch 11 to the meter 20, providing no over-temperature is encountered. As already explained, if an over-temperature condition exists, the opening of the meter contacts 32 and 33 will automatically halt the motor driving the particular selector switch which is in operation at the time, and will automatically cause an alarm to be given. Just prior to termination of the operation of the selector switch 11 wherein the blades 73 and 74 thereof reach the 95th pair of contacts of the switch, the motor 57 will be energized and cause the blades 77 and 78 of the rotary selector switch 12 to advance to the number one pair of contacts, after which the blades of the selector switch 11 will advance to the zero pair of contacts. This latter will cause deenergization of the motor 56, and the operation of connecting thermoelements 19 to the meter 20 will be taken up by the selector switch 12. This cycle is then repeated for each of the selector switches 13, 14 and 15, whereupon the selector switch 10 is again actuated and the overall cycle repeated.

By the above organization, the intervals of time during which each of the thermoelements 19 is connected to the meter 20 are all practically identical, regardless of transference of connections from one selector switch to the other. For example, when the rotary blades of the switch 10 are shifted to the 95th pair of contacts of the switch, the thermoelement 19 connected to said contacts will be connected through the switch 10 to the meter 20 for a period of approximately one and two-thirds seconds. When the rotary blades of the switch 10 shift to the next pair of contacts, marked zero, the blades 73 and 74 of the switch 11 will have, just prior to this, shifted to their first pair of contacts. Therefore, the thermoelement 19 connected with the first pair of contacts of the switch 11 will be connected through the switch to the meter 20 for an interval of time of approximately one and two-thirds seconds also, and so on. Thus it will be seen that transference of operations from one selector switch to the next will not alter the time intervals during which the thermoelements are connected with the meter 20 to actuate the same.

It will be noted that, if all of the rotary blades of the selector switches 10 through 15 are simultaneously placed in upright positions, there will be no energization of any of the motors 55 through 60, the apparatus will be in a condition of rest, and no thermoelement will be connected to the meter 20. An operator may at any time start the apparatus functioning from such a condition of rest by manually shifting any one of the rotary blade assemblies of any selector switch, as desired.

Since, as in the organization provided in my copending application above identified, the rotary blade assemblies of the selector switches may be manually advanced at any time at the will of the operator, any desired temperature may be checked at any time, or any group of thermoelements by-passed in favor of any other group or part of a group. Thus it will be seen that the system is extremely flexible in its operation.

While I have shown herein a total of six staged selector switches, obviously additional switches may be incorporated in the manner indicated, or a lesser number of switches may be used as conditions warrant.

Variations and modifications may be made within the scope of this invention and portions of the improvements may be used without others.

I claim:

1. The method of operating in succession a number of interconnected selector switches each having a plurality of positions including starting, finishing and intermediate positions, and each connected with a plurality of electric circuits, to sequentially connect said circuits to a main circuit, which includes the steps of advancing one selector switch in steps from its starting position through its intermediate positions to its finishing position, advancing said one switch from finishing to starting position and substantially simultaneously advancing the next selector switch from starting to its next position, and thereafter advancing said next selector switch in steps through its remaining positions to its finishing position.

2. The method of operating in succession a number of interconnected selector switches each having a plurality of positions including starting, finishing and intermediate positions, and each connected wth a plurality of electric circuits, to sequentially connect said circuits to a main circuit, which includes the steps of advancing one selector switch in steps from its starting position through its intermediate positions to its finishing position, advancing said one switch from finishing to starting position and substantially simultaneously advancing the next selector switch from starting to its next position, advancing said next selector switch in steps through its remaining positions to its finishing position, advancing the last-operated selector switch from finishing to starting position and substantially simultaneously advancing the first-operated selector switch from starting to its next position, and thereafter advancing said first-operated selector switch in steps through its remaining positions to its finishing position.

3. An apparatus for connecting a plurality of electric circuits sequentially to an electric instrumentality, comprising a plurality of selector switches each having a movable contact and a plurality of stationary contacts engageable by said movable contact; circuit means connecting one movable contact with said instrumentality; circuit means connecting the remaining movable contacts each with a stationary contact of a different one of the switches; circuit means connecting the remaining stationary contacts with said plurality of electric circuits; a plurality of motive means; a plurality of drive means for causing independent intermittent advancing movement of the movable contacts when the motive means are energized, whereby said contacts dwell on stationary contacts for predetermined intervals of time; and automatic control means actuated in response to movement of the movable contacts of the switches, causing said motive means to be energized sequentially and thereby causing sequential operation of said movable contacts, said automatic means deenergizing each motive means after causing energization of a succeeding motive means, and each movable contact and the succeeding movable contact having substantially a common, like period of dwell on associated stationary contacts after energizing of the said succeeding motive means.

4. An apparatus for connecting a plurality of electric circuits sequentially to an electric instrumentality, comprising a plurality of rotary selector switches each having a contact movable in a circle and having a plurality of stationary contacts arranged in a 360° arc and engageable by said movable contact, said stationary contacts including adjacently located first and last contacts engaged in said order by the movable contact in advancing through said 360° arc; circuit means connecting one movable contact with said instrumentality; circuit means connecting the remaining movable contacts each with a last stationary contact of a different one of the switches; circuit means connecting the remaining stationary contacts with said plurality of electric circuits; a plurality of motive means; a plurality of drive means for causing independent intermittent advancing movement of the movable contacts when the motive means are energized, whereby said contacts dwell on stationary contacts for predetermined intervals of time; and automatic control means actuated in response to movement of the movable contacts of the switches, causing said motive means to be energized sequentially and thereby causing sequential operation of said movable contacts, said automatic means causing energization of each motive means when the movable contact of the preceding switch reaches the next-to-last stationary contact, and deenergizing each preceding motive means when the movable contact of the associated switch reaches the last stationary contact, each movable contact and its succeeding movable contact having substantially a common, like period of dwell on associated stationary contacts after said energizing of a motive means.

5. An apparatus for connecting a plurality of electric circuits sequentially to an electric instrumentality, comprising a plurality of selector switches each having a movable contact and a plurality of stationary contacts engageable by said movable contact; circuit means connecting one movable contact with said instrumentality; circuit means connecting the remaining movable contacts each with a stationary contact of a different one of the switches; circuit means connecting the remaining stationary contacts with said plurality of electric circuits; a plurality of motive means; a plurality of drive means for causing independent intermittent advancing movement of the movable contacts when the motive means are energized, whereby said contacts dwell on stationary contacts for predetermined intervals of time; and automatic control means actuated in response to movement of the movable contacts of the switches, causing said motive means to be repeatedly energized sequentially and thereby causing repeated sequential operation of said movable contacts, said automatic means deenergizing each motive means after causing energization of a succeeding motive means, and each movable contact and the succeeding movable contact having substantially a common, like period of dwell on associated stationary contacts after energizing of the said succeeding motive means.

6. An apparatus for connecting a plurality of electric circuits sequentially to an electric instrumentality, comprising a plurality of selector switches each having a movable contact and a plurality of stationary contacts engageable by said movable contact; circuit means connecting one movable contact with said instrumentality; circuit means connecting the remaining movable contacts each with a stationary contact of a different one of the switches; circuit means connecting the remaining stationary contacts with said plurality of electric circuits; a plurality of motive means; a plurality of drive means for causing independent intermittent advancing movement of the movable contacts when the motive means are energized, whereby said contacts dwell on stationary contacts for predetermined intervals of time; and automatic control means including, for each movable contact, a pair of switches actuated one after the other in response to movements of the associated movable contact to two predetermined adjacent stationary contacts, causing said motive means to be energized sequentially and thereby causing sequential operation of said movable contacts, said automatic means deenergizing each motive means after causing energization of a succeeding motive means, and each movable contact and the succeeding movable contact having substantially a common, like period of dwell on associated stationary contacts after energizing of the said succeeding motive means.

7. An apparatus for connecting a plurality of electric circuits sequentially to an electric instrumentality, comprising a plurality of selector switches each having a movable contact and a plurality of stationary contacts engageable by said movable contact; circuit means connecting one movable contact with said instrumentality; circuit means connecting the remaining movable contacts each with a stationary contact of a different one of the switches; circuit means connecting the remaining stationary contacts with said plurality of electric circuits; a plurality of motive means, a plurality of drive means for causing independent intermittent advancing movement of the movable contacts when the motive means are energized, whereby said contacts dwell on stationary contacts for predetermined intervals of time; and automatic control means, including, for each movable contact, a pair of switch means actuated one after the other in response to movements of the associated movable contact to two predetermined adjacent stationary contacts, causing said motive means to be energized sequentially and thereby causing sequential operation of said movable contacts, said automatic means including circuits for the switch means whereby the second-to-operate switch means deenergizes a motive means, and the first-to-operate switch means prior to such deenergization causes energization of a succeeding motive means, said energization being maintained by the second-to-operate switch means and each movable contact and the succeeding movable contact having substantially a common, like period of dwell on one of said two adjacent stationary contacts after energizing of the said succeeding motive means.

KNUD J. KNUDSEN.

No references cited.